United States Patent
Hjort

(10) Patent No.: US 7,654,593 B2
(45) Date of Patent: Feb. 2, 2010

(54) SAFETY HOOK FOR PATIENT LIFT

(75) Inventor: Mogens Hjort, Korsor (DK)

(73) Assignee: Ergolet A/S, Korsor (DK)

( * ) Notice: Subject to any disclaimer, the term of this patent is extended or adjusted under 35 U.S.C. 154(b) by 0 days.

(21) Appl. No.: 10/544,585

(22) PCT Filed: Feb. 4, 2004

(86) PCT No.: PCT/EP2004/001006

§ 371 (c)(1),
(2), (4) Date: Aug. 3, 2005

(87) PCT Pub. No.: WO2004/069126

PCT Pub. Date: Aug. 19, 2004

(65) Prior Publication Data

US 2006/0162137 A1    Jul. 27, 2006

(30) Foreign Application Priority Data

Feb. 5, 2003   (EP) ................... 03002434

(51) Int. Cl.
*A61G 7/10* (2006.01)
*B66C 1/36* (2006.01)
(52) U.S. Cl. .............. 294/81.56; 294/82.19; 294/82.21; 24/600.2; 24/600.3
(58) Field of Classification Search ............. 294/81.56, 294/153; 4/560.1; 24/598.4, 600.2, 599.9, 24/600.3
See application file for complete search history.

(56) References Cited

U.S. PATENT DOCUMENTS

| 1,276,008 A | * | 8/1918 | Shaner ...................... 24/598.4 |
| 1,554,303 A | * | 9/1925 | Smith ......................... 294/82.2 |
| 1,956,786 A | * | 5/1934 | Bemis ...................... 294/82.21 |
| 2,432,342 A | * | 12/1947 | Shaner ....................... 24/598.4 |
| 2,710,766 A | * | 6/1955 | Erlewine ................. 294/81.56 |
| 2,928,692 A | * | 3/1960 | Gowan ..................... 294/82.19 |
| 3,857,118 A | | 12/1974 | Mamo et al. ................. 4/500.1 |
| RE28,709 E | * | 2/1976 | Crook, Jr. .................. 294/82.2 |
| 4,909,555 A | * | 3/1990 | Blasi ....................... 294/81.56 |
| 5,463,798 A | | 11/1995 | Wurzer ...................... 24/599.5 |
| 5,892,180 A | | 4/1999 | Carey .......................... 177/144 |
| 5,938,521 A | * | 8/1999 | Jasek et al. ................. 452/192 |
| 6,289,534 B1 | | 9/2001 | Hakamiun et al. ............ 5/89.1 |

FOREIGN PATENT DOCUMENTS

| EP | 1452478 | * | 2/2003 |
| FR | 946394 | | 6/1949 |

* cited by examiner

*Primary Examiner*—Paul T Chin
(74) *Attorney, Agent, or Firm*—K. David Crockett, Esq.; Niky Economy Syrengelas, Esq.; Crockett & Crockett

(57) ABSTRACT

A safety hook for mounting on the extremity of a spreader bar of a patient lift is secured to a base member that is connected to or integral with the spreader bar. A load-bearing hook member is pivotally suspended from the base member to allow the hook member to move in the plane of the hook member between an open position and a closed position in which the free end of the hook member engages the base member at an engagement point. The hook member is shaped such that it is urged to the closed position when a downward load is applied to it, and that it is urged to the open position when an upward load is applied to it. Under normal circumstances the safety hook closes automatically because of the weight of the load.

9 Claims, 3 Drawing Sheets

SAFETY HOOK FOR PATIENT LIFT

The present invention relates to a safety hook for mounting on the extremity of a spreader bar of a patient lift of the type that comprises a base member, a load-bearing hook member extending in a first plane and having a first end and a second free end.

BACKGROUND ART

The hooks on the extremities of the spreader bar of a patient lift used for attaching a sling, harness or lifting belt to the spreader bar of a patient lift are normally provided with measures to minimize the risk of unintentional release of the attachment loops at the free ends of the support straps of the sling, harness or lifting belt. These measures usually comprise double hooks creating a labyrinth, corkscrew hooks, or resilient clips (snap finger) or other resilient means that close the opening of a simple hook. All of these measures have in common that the operation of attaching and detaching an attachment loop from the hook is cumbersome and the operator usually needs to use both hands.

DISCLOSURE OF THE INVENTION

Against this background, it is an object of the present invention to provide a safety hook for a patient lift of the kind referred to initially, that allows comfortable detachment and attachment of attachment loops. This object is achieved in accordance with claim 1 by providing a hook of said kind in which the first end is pivotally suspended from the base member at a pivot axis to allow the hook member to move in the plane of the hook member between an open position and a closed position in which the free end of the hook member engages the base member at an engagement point, and whereby the hook member extends from the pivot axis to one side of a second plane which falls together with the pivot axis and the engagement point, the hook member extending further through the second plane to its free end.

Thus, the hook member is shaped such that it is urged to the closed position when a downward load is applied to it, and urged to the open position when an upward load is applied to it. Under normal circumstances the safety hook closes automatically under the weight of the load. Unintentional opening of the safety hook is excluded as there can there cannot be an upward load under normal circumstances. Releasing a sling or lifting belt from the safety hook is very simple, the operator merely needs to pull the attachment loop of the sling or lifting belt upwards to open the safety hook and the attachment loop can be released.

The safety hook may comprise means for retaining the hook member in the closed position, these means preferably comprising a resiliently biased locking member in the base member for engaging a first recess in the hook member.

Thus, the chance that the hook member moves out of the closed position due to e.g. violent movements of the spreader bar is minimized.

The safety hook may comprise means for retaining the hook member in the open position, these means preferably comprising the resiliently biased locking member in the base member for engaging a second recess in the hook member.

Thus, the hook member can remain in the open position for attaching or detaching a load such as the attachment loop of a sling.

The safety hook may be constructed such that the free end of the hook member positively engages the base member at the engagement point, preferably by complementary shapes provided on the free en of the hook member and on the base member at the engagement point.

Thus, the chance that the hook member deforms under an extreme load is reduced.

The base member can an integral part of the spreader bar or can be attached to the spreader bar.

The second plane is preferably substantially parallel with the spreader bar, with the hook member extending downwards from the pivot axis so that a downward load applied on the hook member urges it to the closed position.

The hook member preferably comprises a part proximate to the free end that extends substantially parallel with the spreader bar so that an upward load applied on the hook member urges it to the open position.

Further objects, features, advantages and properties of the safety hook according to the invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION

Figure 1:
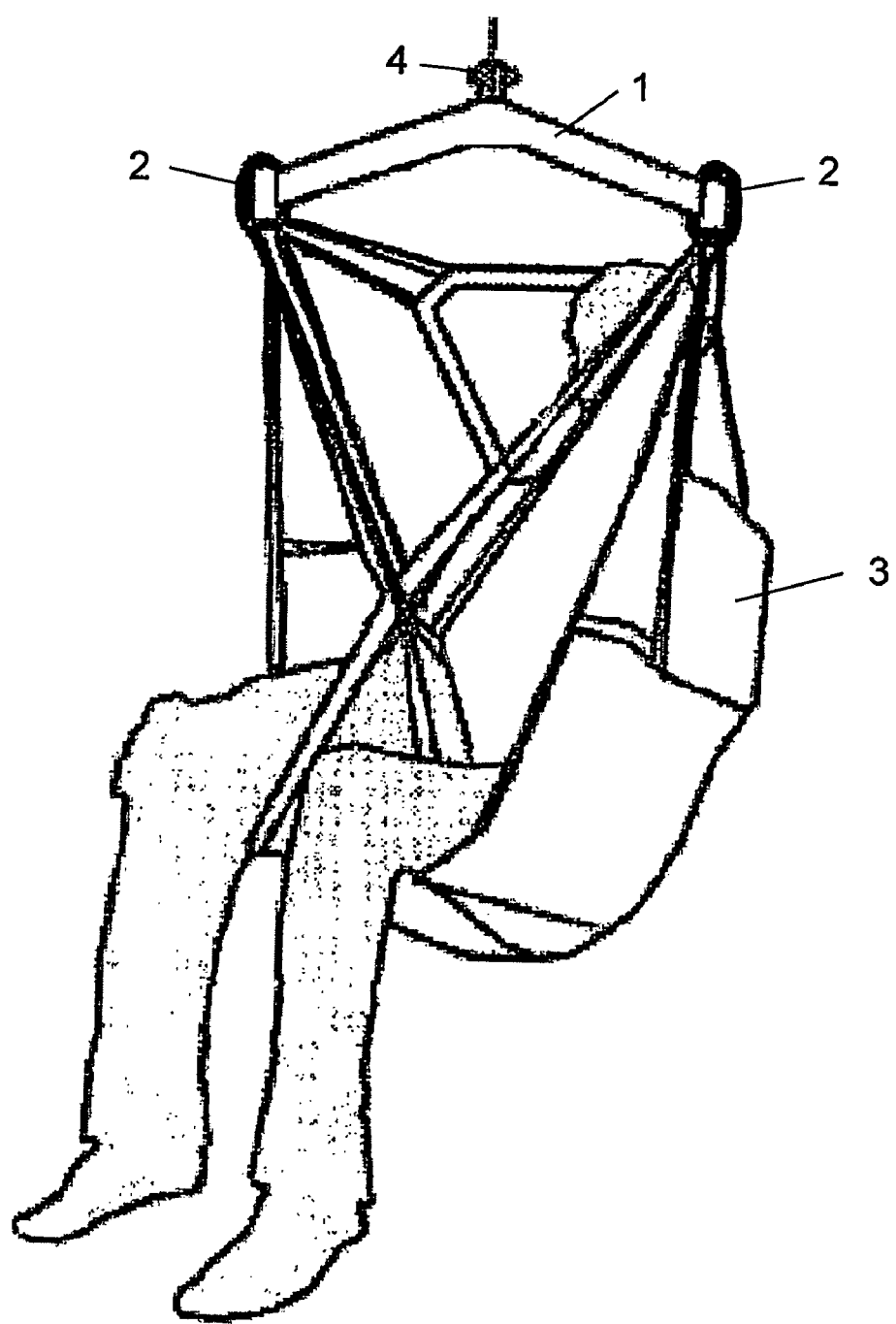
FIG. 1 is a view of a part of a patient lifting system.

A part of a patient lift system is illustrated in FIG. 1, comprising a spreader bar 1 suspended from a connection point 4 in the middle on top by a strap or wire from a not shown lifting device. Suitable lifting devices are e.g.
- ceiling lifts operating with an overhead rail from which the spreader bar is suspended by a strap, or cable, usually via a winch, or
- floor lifts operating with a wheeled frame provided with a mast and a lifting arm to which the wire or strap is connected, all well known in the art.

Hook members 2 extend from both horizontal extremities of the spreader bar 1. The patient to be lifted is carried by a sling 3. The sling 3 is provided with a plurality of support straps provided with attachment loops at their free ends. The attachment loops are securely hung over the safety hooks 2. Other types of slings such as walking slings, stretcher slings, lifting belts, patient harness or other devices used for supporting a patient to be lifted can be used instead of the sling shown in FIG. 1.

Figure 2:
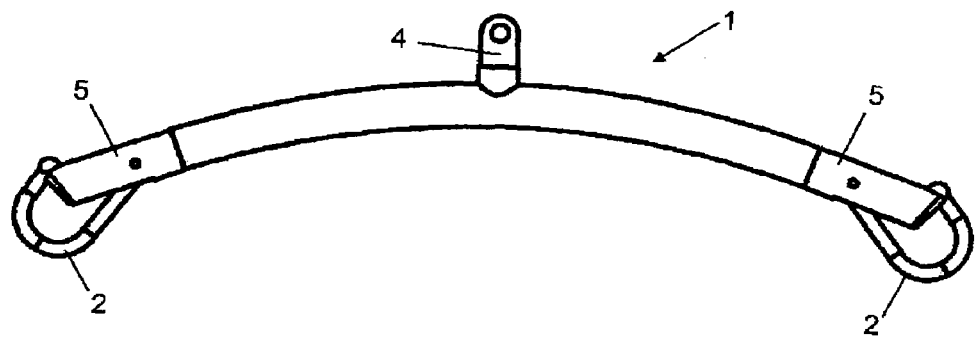
FIG. 2 is a side view of a spreader bar provided with safety hooks according to the present invention.

FIG. 2 shows a side view of the spreader bar 1 in greater detail. The spreader bar 1 is shaped as a curved bar (straight bars, or bars formed by two straight parts at an angle (cf. FIG. 1) are equally suitable). A base member 5 of the safety hook according to the invention is mounted at each horizontal extremity of the spreader bar 1. A hook member 2 is suspended from each of the base members 5.

Figure 3:
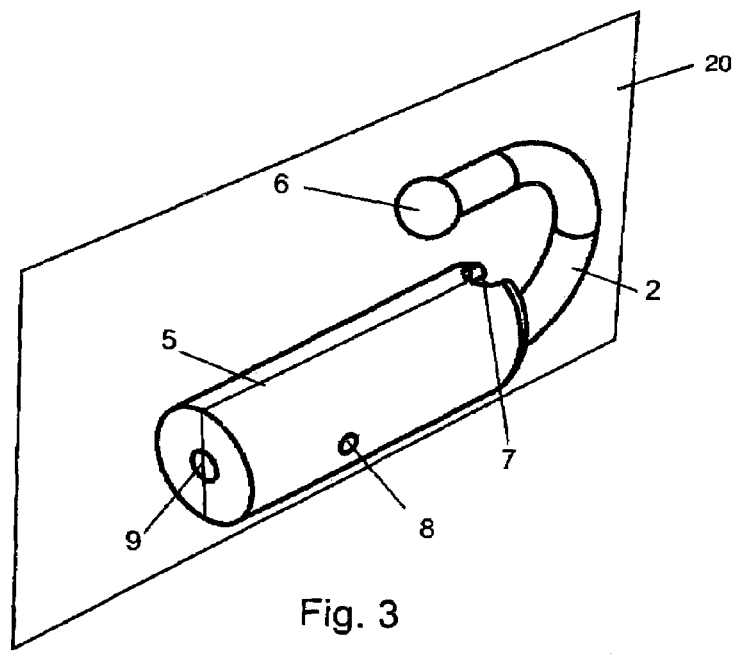
FIG. 3 is a perspective view of a safety hook according to the present invention.

FIG. 3 shows a perspective view of a safety hook according to the invention in even greater detail. The main body of the base member 5 is formed by a substantially cylindrical body, but any other shape could be used instead. The hook member 2 is at a first end suspended from the base member 5 by a pivot shaft 8. The second free end of the hook member 2 is provided with a substantially ball shaped projection 6. The base member is provided with a complementary spherical recess 7 for receiving the ball shaped projection 6.

Figure 4:
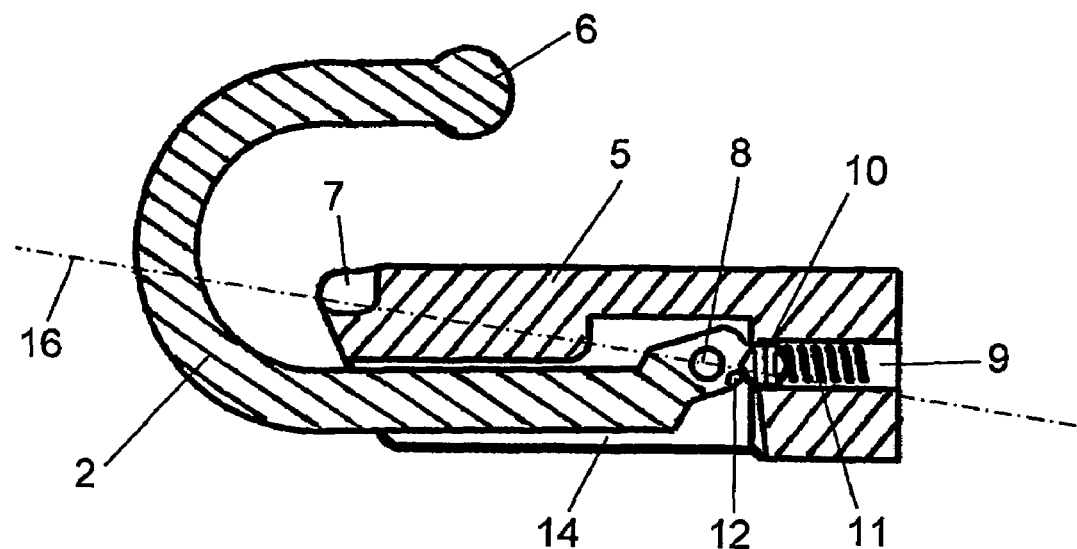
FIG. 4 is a cross-sectional view of the safety hook according to the present invention in an open position.
Figure 5:
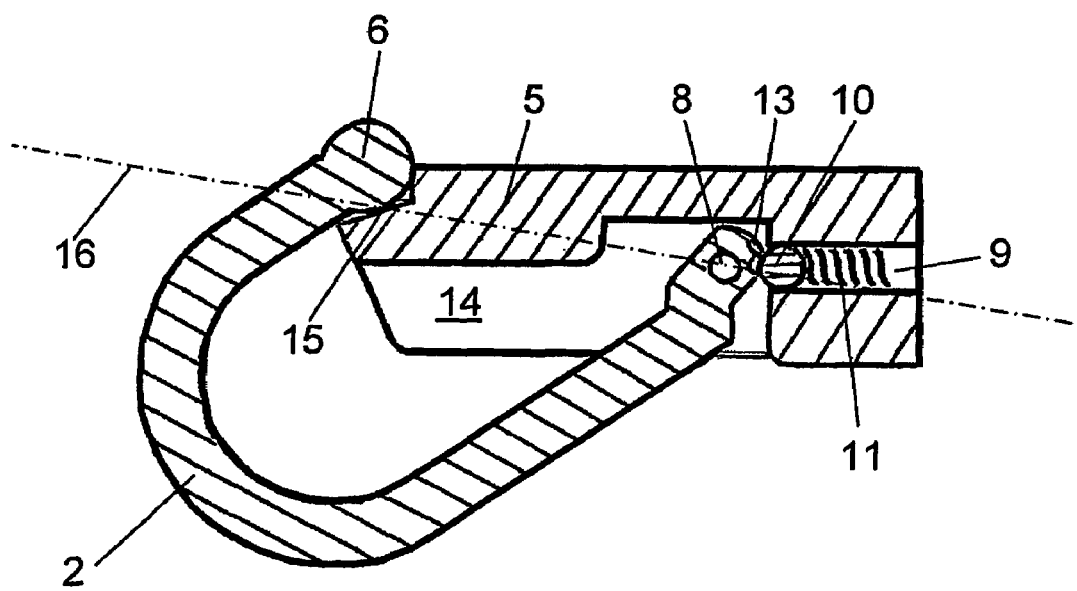
FIG. 5 is a cross-sectional view of the safety hook according to the present invention in a closed position.

FIGS. 4 and 5 show a safety hook according to the invention in cross-sectional views in the open and closed position respectively. The base member 2 is provided with a slot 14 for receiving part of the hook member 2. The pivot shaft 8 extends through the slot 14 and through the first end of the hook member 2, allowing hook member 2 to be suspended from the base member so that it can rotate in the plane of the hook member 2 between an open position (cf. FIG. 4) and a closed position (cf. FIG. 5). The first plane is the plane that includes the rotation of the hook member 2 between the open position and the closed position, item number 20 shown in FIG. 3.

The base member is provided with a channel 9 that opens into the slot 14 so that it faces the first end of the hook member 2. A spring 11 arranged in the channel 9 urges a ball 10 towards the first end of the hook member 2. The first end of the hook member 2 is provided with a recess 12 for engaging the spring loaded ball 10 in the closed position, and with a with a recesses 13 for engaging the spring loaded ball 10 in the open position.

When the hook member is moved to the open position or to the closed position the spring loaded ball 10 snaps into the respective recess 12,13 and thus the hook member is retained either the open position or in the closed position unless a substantial force is applied to move the hook member to the other position.

In the open position an attachment loop of e.g. a sling 3 can easily be hung over the hook member 2. This operation can, if necessary, be carried using only one hand, since the hook member 2 stays in the open position because the gravity force caused by the weight of the hook member 2 alone is not sufficient to overcome the resistance of the spring loaded ball 10.

When a load is applied, e.g. when a patient takes place in the sling 3, the downward force applied to the hook member is big enough to overcome the retaining force created by the spring loaded ball 10 and the hook member moves to the closed position in which the ball shaped protrusion 6 at free end of the hook member 2 positively engages the spherical recess 7 at a contact point 15. The positive engagement increases the overall stability of the safety hook, and minimizes the risk of deformation of the hook member 2 under excessive load.

The hook member 2 and the base member 5 form a closed loop and as long as the hook member 2 stays in the closed position any attachment loops hung over the hook member 2 cannot be unintentionally be disengaged from the safety hook. Under normal circumstance the load itself prevents the hook member 2 to move unintentionally to the open position. The spring loaded ball 10 ensures that the hook member 2 also remains in the closed position even if the load does not apply a downward force, e.g. for short periods of time caused by violent movements of the spreader bar 1. The risk of an attachment loop of a sling 3 to disengage unintentionally is therefore minimized.

The attachment loop can be disengaged from the safety hook by a user simply pulling the attachment loop upwards with a force sufficient to overcome the retaining force of the spring loaded ball 10, and thus move the hook member 2 to the open position where it is retained again by the spring loaded ball 10. When the safety hook is open the attachment loop or loops can be removed from the hook member 2 to disengage the sling 3

Line 16 represents the second plane that includes the pivot axis of shaft 8 and the contact point 15 where the free end 6 of the hook member 2 engages the base member 5. The hook member 2 extends from its first end to the lower side of the second plane and turns upwards though the second plane until its free end is on the upper side of the second plane. Any such shaped hook member is suitable for use with the present invention, since it will automatically lock under load. The second plane may be considered as perpendicular to the first plane.

The use of the safety hook as described with reference to the preferred embodiments is not limited to mounting on spreader bars of ceiling lifts. The lifts could be floor lifts, and the hook may e.g. also be mounted on the end of the lifting arm of a floor lift.

Although the present invention has been described in detail for purpose of illustration, it is understood that such detail is solely for that purpose, and variations can be made therein by those skilled in the art without departing from the scope of the invention.

Thus, while the preferred embodiments of the devices and methods have been described in reference to the environment in which they were developed, they are merely illustrative of the principles of the inventions. Other embodiments and configurations may be devised without departing from the scope of the appended claims.

The invention claimed is:

1. A safety hook for mounting on the extremity of a spreader bar (1) of a patient lift comprising:
    a base member (5),
    a load-bearing hook member (2) extending in a first plane oriented in a first direction and having a first end and a second free end, characterized by the first end being pivotally suspended from the base member (5) at a pivot axis to allow the hook member (2) to move in the first plane between an open position and a closed position in which the free end of the hook member engages the base member at an engagement point (15), and whereby the hook member (2) extends from the pivot axis to one side of a second plane which is oriented in a second direction substantially perpendicular to the first plane which falls together with the pivot axis and the engagement point (15), the hook member (2) extending further through the second plane to its free end in both the open and the closed positions said engaging of the hook member with the base member preventing the tip of the hook member from being able to travel through the second plane and said engaging of the hook member closing the safety hook.

2. A safety hook according to claim 1, further comprising means for retaining the hook member (2) in the closed position, the means comprising a resiliently biased locking member (10) in the base member (5) for engaging a first recess (12) in the hook member (2).

3. A safety hook according to claim 2, further comprising means for retaining the hook member (2) in the open position, the means comprising the resiliently biased locking member (10) in the base member (5) for engaging a second recess (13) in the hook member (2).

4. A safety hook according to claim 3, wherein the free end of the hook member (2) positively engages the base member (5) at the engagement point (15), by complementary shapes (6,7) provided on the free end of the hook member (2) and on the base member (5) at the engagement point (15).

5. A safety hook according to claim 1 wherein the base member (5) is an integral part of the spreader bar (1).

6. A safety hook according to claim 1 wherein a downward load applied to the hook member moves the member to the closed position.

7. A safety hook according to claim 6, wherein an upward load applied to the hook member moves the member to the open position.

8. A safety hook for mounting on the extremity of a spreader bar of a patient lift comprising:

a base member, a load-bearing hook member extending in a first plane oriented in a first direction and having a first end and a second free end, the first end being pivotally suspended from the base member at a pivot axis to allow the hook member to move in the first plane between an open position and a closed position, in the open position the first end of the hook member is disposed on one side of a second plane which is oriented in a second direction substantially perpendicular to the first plane which falls together with the pivot axis and the engagement point, and the free end of the hook member extends through the second plane and is disposed on the second side of the plane in both the open position and the closed positions, in the closed position the free end of the hook member engages the base member at an engagement point preventing the tip of the hook member from being able to travel through the second plane and said engaging of the hok member closing the safety hook.

9. A patient lifting apparatus having a lifting arm provided with a safety hook attached to an extremity of the lifting arm, said safety hook comprising:

a base member, a load-bearing hook member extending in a first plane oriented in a first direction and having a first end and a second free end, characterized by the first end being pivotally suspended from the base member at a pivot axis to allow the hook member to move in the first plane between an open position and a closed position in which the free end of the hook member engages the base member at an engagement point, wherein a portion of the hook member that starts at said first end is disposed that one side of a second plane oriented in a second direction substantially perpendicular to the first plane which falls together with the pivot axis and the engagement point, and wherein another portion of the hook member that includes said free end is disposed on the other side of that second plane when the hook member is in the open and closed positions the engaging of the hook member with the base member at the engement point preventing the tip of the hook member from being able to travel through the second plane and said engaging of the hook member closing the safety hook.

* * * * *